IMPRINTER WITH PRINT MODE SELECTION

Filed Dec. 22, 1967 2 Sheets-Sheet 1

INVENTORS
JOSEPH C. BAKER
THOMAS W. THOMPSON
BY
Robert W. Lahtinen
ATTORNEY

IMPRINTER WITH PRINT MODE SELECTION

Filed Dec. 22, 1967 2 Sheets-Sheet 2

United States Patent Office 3,515,063

Patented June 2, 1970

3,515,063

IMPRINTER WITH PRINT MODE SELECTION

Joseph C. Baker, Stewartville, and Thomas W. Thompson, Rochester, Minn., assignors to International Business Machines Corporation, Armonk, N.Y., a corporation of New York Filed Dec. 22, 1967, Ser. No. 692,894
Int. Cl. B41f 3/04
U.S. Cl. 101—269 8 Claims

ABSTRACT OF THE DISCLOSURE

The specification herein describes an imprinting device for printing single or multiple documents which provides for automatically sensing the thickness of the document pad and adjusting the relationship between print member and printing platen when positive interference printing is used and for providing a desired preload with a desired initial interference and overload relief when print member and printing platen are yieldably positioned for printing. Also included is the structure which not only affords the varying position locked relationship in response to the thickness sensed but also provides for selection of a soft print wherein print member and platen are yieldably positioned with respect to one another or for a positive interference print.

BACKGROUND OF THE INVENTION

This invention relates to printing devices and, more particularly, to a device for imprinting varying numbers of documents or documents of variable thickness.

In current sales transaction recording devices it is necessary to provide receipt or credit memoranda and an audit record. It is most desirable that a recording device provide all recording functions and identification in a single continuous cycle to simultaneously identify the related information pertaining to the sale on the audit record and the customer's memorandum or receipt. In a cash sale the receipt and audit record are usually generated simultaneously. In a credit sale it is common to use an inexpensive plastic plate having the customer's name and account number embossed on the surface. This plate is mounted in a recording device to provide for printing both the audit record on a continuous strip of tape and to imprint a multiple copy sales check during a continuous print cycle.

It is necessary that the impressions made from the card be accomplished with an adequate print quality to permit further processing of the audit to be accomplished using automatic reading equipment. But it is likewise necessary that the credit card that serves as the print member not be subjected to pressures by the printing platen that will cause the embossed characters to be destroyed or the useful life thereof compromised. This must be accomplished irrespective of the thickness of the document, such as a multiple copy sales check, which is being imprinted or the variation in thickness of the plastic card or the embossed characters thereon.

SUMMARY

The imprinting machine of this invention provides a gauge or sensing member that determines the position of the print member with respect to the printing platen in accordance with the thickness of the document to be printed and provides a variable locking mechanism to positively support the bed carrying the print member at the established height. The machine of the embodiment illustrated and described herein further provides for selecting either soft printing wherein the printing platen and cooperating print member are yieldably urged toward one another or hard printing wherein the printing platen and print member oppose one another in a rigidly supported relation. This selectivity is accomplished by a locking means, which affords positive engagement and resistance to movement of the print member away from the platen roller when the sensed document thickness exceeds a predetermined value, but disables the locking means when a document of less than the predetermined thickness is sensed to cause the document to be imprinted by a soft print effected only by the upward biasing means which urges the platen toward the imprinting roller.

In the hard print condition the sensing shoe cooperates with the locking means to establish a desired interference between printing element and platen in accordance with the sensed thickness of document and print element. When a soft print condition is utilized the sensing shoe functions to preload the system to a desired force with the means biasing platen and print member toward one another affording overload relief when the force against the sensing shoe has been wholely unloaded by transfer to the platen. Interference between print member and platen beyond that required to unload the force on the sensing shoe need only overcome the additional closing force of the biasing means which is relatively insignificant since displacement is small and the spring constant of the biasing means is nominal.

It is an object of this invention to provide a printer that will print with a quality to permit further processing of the printed document by automatic machinery and will not either damage or alter the character of the print element.

It is an object of this invention to provide a device that will sense the thickness of the document to be printed.

It is a further object of this invention to provide a print mechanism that will automatically adjust to position the print member of a printing device with respect to the printing platen in accordance with the thickness of the document to be printed.

It is a further object of this invention to provide an imprinter that will compensate for variations in the thickness of a print member inserted therein.

It is a further object of this invention to provide a device that will selectively provide for hard printing and soft printing of documents during different portions of a continuous print cycle.

The foregoing and other objects, features and advantages of the invention will be apparent from the following more particular description of a preferred embodiment of the invention as illustrated in the accompanying drawings.

DETAILED DESCRIPTION

Figure 1:
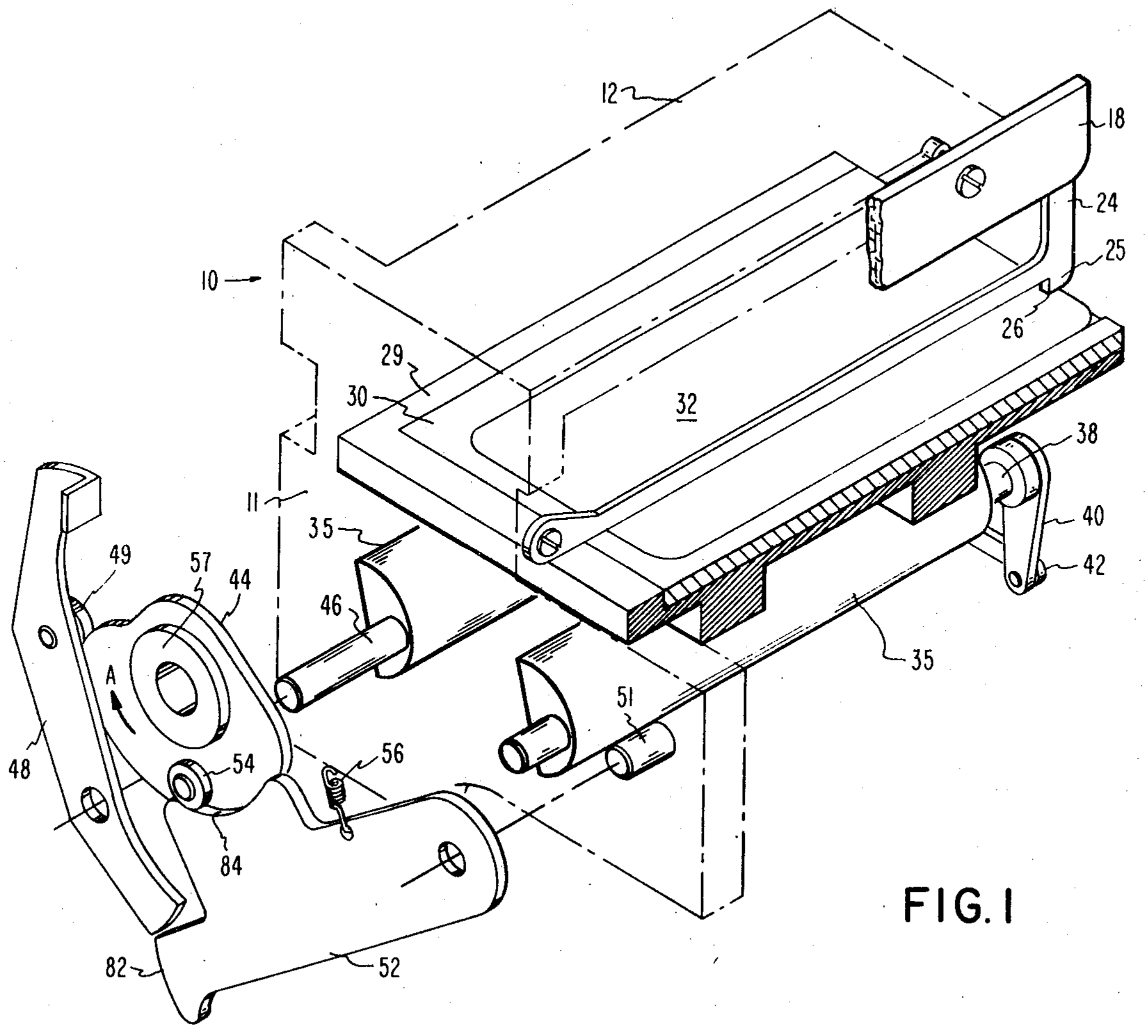
FIG. 1 is a partial exploded isometric view of an imprinter, partially in section and partially broken away showing the present invention.
Figure 7:
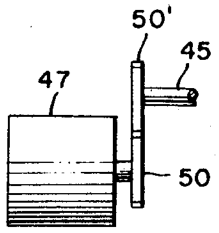
FIG. 7 is a schematic showing of a drive means for the cam shaft.
Figure 4:
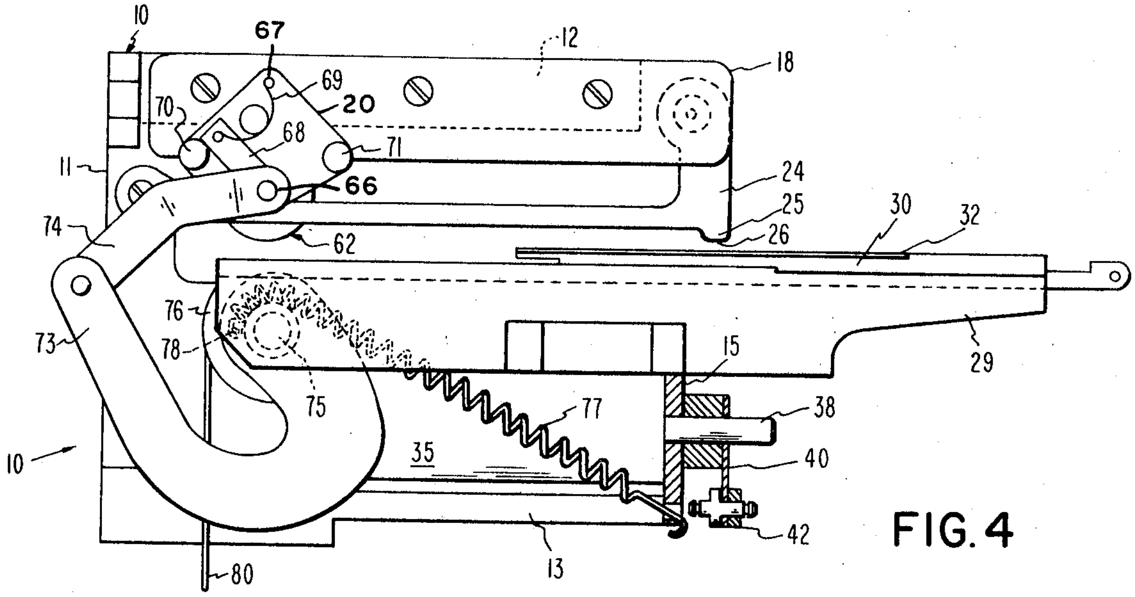
FIG. 4 is a partial side elevation partly in section of the imprinter of FIG. 1 with portions shown in phantom view.

Referring to FIGS. 1 and 4 of the drawings, the imprinter has a stationary unit frame 10 including a rear wall 11 and cantilevered wall portions 12 and 13 formed as an integral part thereof. A plate member 15 is secured to the distal end of cantilevered wall 13. A pair of support rails 18 and 19 are bolted to either side of cantilevered wall 12 with the heads of the securing bolts recessed to avoid interference with bearing blocks 20 and 21 that move along the lower surface of the support rails in close proximity to the side surfaces. A sensing rail 24 is bolted at one end to the support rail 18 and at the opposite end to the unit frame rear wall 11. Formed as an integral part of the sensing rail is a downwardly projecting sensing shoe 25 that presents a downwardly facing surface 26. A similar rail member of lighter gauge and without a sensing shoe is mounted at the opposite lateral side of the cantilevered wall. A bed 29 is supported on unit frame 10 for vertical reciprocating movement and carries a card tray 30 which is slidable between an extended loading position as shown in FIG. 4 and an inward operating position as viewed in FIG. 1. The card tray 30 carries a print member 32, commonly an embossed plastic credit card, on which are formed raised characters. The bed 29 is supported on the unit frame and reciprocated by a pair of longitudinally extending eccentric members 35 which are supported on the unit frame by trunnions which respectively extend through and are journaled within unit frame rear wall apertures and apertures in the front plate member 15. The trunnions 38 projecting beyond the plate member 15 respectively carry levers 40 which are each rigidly connected for pivotal movement in unison with the associated eccentric 35. The levers 40 are each pivotally interconnected to an end of link member 42 to cause the eccentrics 35 to cooperate in uniformly raising and lowering the bed 29 with a parallel reciprocating motion. A spring 43 shown schematically in FIG. 2 urges the levers 40 in one pivotal direction to accomplish an upward biasing of the bed 29 and car tray 30.

At the side of the rear wall 11 opposite bed 29 and eccentrics 35 is mounted a cam 44 carried by a shaft 45, which controls the cycle of the print mechanism by rotating in the direction of the arrow A. Shaft 45 and cam 44 are rotated in unison by a motor 47 through cooperating gears 50, 50'. Rigidly mounted on the projecting portion of the trunnion 46 is a cam follower arm 48 carrying a cam follower 49 that engages the peripheral surface of cam 44. The unit frame 10 carries a projecting stud 51 about which is rotatably mounted a lock arm 52 which lies in the same plane as cam follower arm 48 and engages the cam carried roller 54 between cycles of operation when cam 44 is disposed in the position shown in FIG. 1. A spring 56 biases the lock arm 52 toward the axis of cam 44, with the maximum travel of the lock arm being limited by contact with the peripheral surface of a washer 57 carried by cam 44 when the roller 54 is rotated out of engagement with the lock arm.

Figure 2:
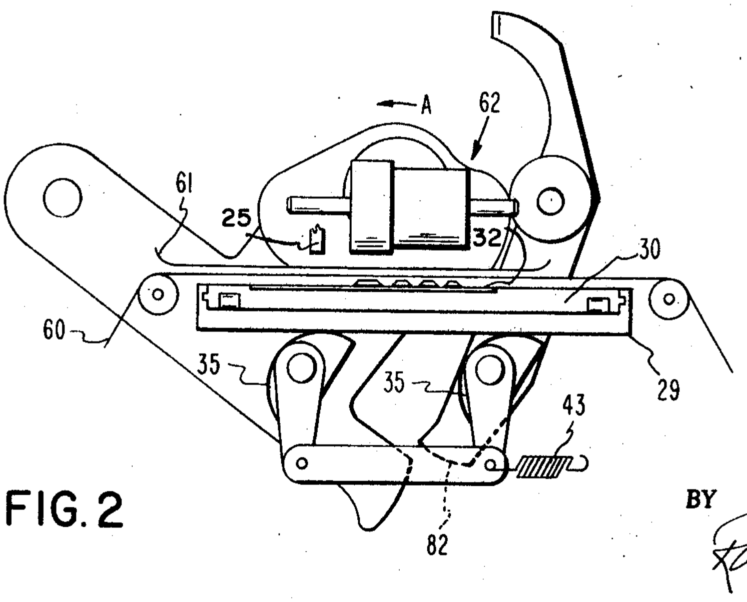
FIG. 2 is a partial end elevation view of the imprinter of FIG. 1 showing the print member, locking structure and the roller platen.

As seen in FIG. 2, a continuous strip paper tape 60 overlies credit card 32 in the operating position while an ink source or carbon ribbon 61 overlies the paper tape. An impression of the characters on the print member or credit card is made on the paper tape 60 in the operating position by moving a roller platen 62 from right to left (as viewed in FIG. 4) when the card tray is in its raised operative position. During the print cycle the platen 62 first moves from the home position illustrated in FIG. 4 to the maximum travel effected by pivoting drive arm 73 clockwise, thereafter the bed 29 is raised to the operative position with the documents compressed between sensing shoe 25 and print member 32 and finally imprinting is effected during the return stroke of the roller platen 62 from right to left.

Figure 5:
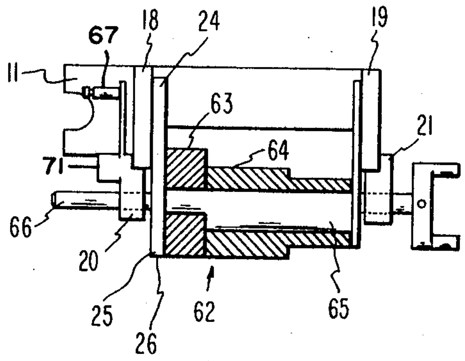
FIG. 5 is a partial front elevation with the roller platen shown in vertical axial section.

As seen in FIG. 5, the roller platen 62 is split into two axial portions 63 and 64 with platen member 64 mounted about an eccentric portion 65 of the roller shaft 66 and the platen portion 63 mounted about a circular portion concentric with the axis of the shaft. The roller shaft 66 is carried by the bearing blocks 20 and 21 that respectively engage the support rails 18 and 19 along respective lower surface and marginal lower side surface portions thereof to permit the roller platen 62 to move horizontally, as seen in FIG. 4, translating the axis of the roller shaft 66 in a horizontal plane defined by the lower surfaces of the support rails 18 and 19. The platen portion 63 presents a lower tangent printing surface during each horizontal stroke of the roller platen 62, whereas the platen portion 64 prints only when the eccentric 65 is pivoted to bring the lower line of horizontal tangency of the platen portion into alignment with that of the platen portion 63. A lever 68, as seen in FIG. 4, is secured to the roller shaft 66 for movement in unison therewith. Bearing block 20 which is journaled about shaft 66 and is guided along lower surface portions of support rail 18, as seen in FIG. 4, carries a pair of projecting stop projections 70, 71 and a stud 67 to which one end of sear spring 69 is secured. With the spring 69 urging the lever 68 against the projecting stop 70, the eccentric portion of the roller shaft is positioned to dispose the platen portion in the position shown in FIG. 5 causing both platen portions to imprint as the roller platen is passed over the print member 32. When the lever 68 is urged over center against the biasing force of spring 69 to a position of engagement with the projecting stop member 71, the roller platen portion 64 is moved by the eccentric portion 65 of the roller shaft to the position shown in FIG. 2 permitting only the platen portion 63 to print as the platen roller assembly is passed over the print member. The roller platen assembly is driven by pivoting a pair of drive arms 73 one of which is shown in FIG. 4 which are connected to opposite ends of the roller shaft by links 74. The drive arms are mounted on the unit frame about a stub shaft 75 which also carries a pulley 76 secured thereto for rotation in unison. The drive arm is urged in a clockwise direction as seen in FIG. 4 by a spring 77 secured at one end to plate member 15 and at the opposite end to a projection 78 carried by pulley 76. The drive arm 73 is moved in the counterclockwise direction against the biasing force of the spring 77 by a tensile force applied to a cable 80 that is received about and secured to the pulley 76.

OPERATION

Figure 6:
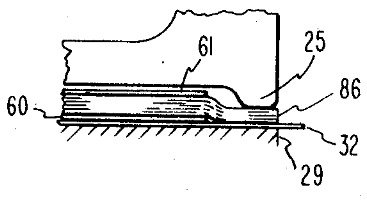
FIG. 6 is an enlarged partial section showing the sensing shoe and bed with a print member and document compressively retained therebetween.

In operation, a credit card or print member 32 is inserted in the card tray 30 and the tray moved into the operating position. A continuous journal tape 60 upon which information is to be recorded is disposed in overlying relation to the print member 32 and indexed as entries are made thereon by a mechanism not shown. Overlying journal tape 60 is a carbon ribbon 61 which serves as an ink source for the imprinting operation. A sales slip 86 which may take the form of a multiple copy document with intervening carbon sheets is manually placed in the machine and fed into the imprinter by a means not shown. Such a sales check feed for a time shared imprinter is shown and described in copending application Ser. No. 603,562, assigned to the same assignee. When actuated, the imprinter cycles through two printing operations. During the first operation the platen portion 63 imprints the credit card number on the journal tape. Intermediate the two cycles the printing platen roller shaft is pivoted, moving lever 68 from engagement with stop 70 to engagement with stop 71, to bring the platen portion 64 into print position and during the second operation, which follows feeding of the sales check into the imprinter intermediate the carbon ribbon and the journal tape as schematically illustrated in FIG. 6, the imprinter prints both the account number and the name and address information upon the sales check.

Figure 3:
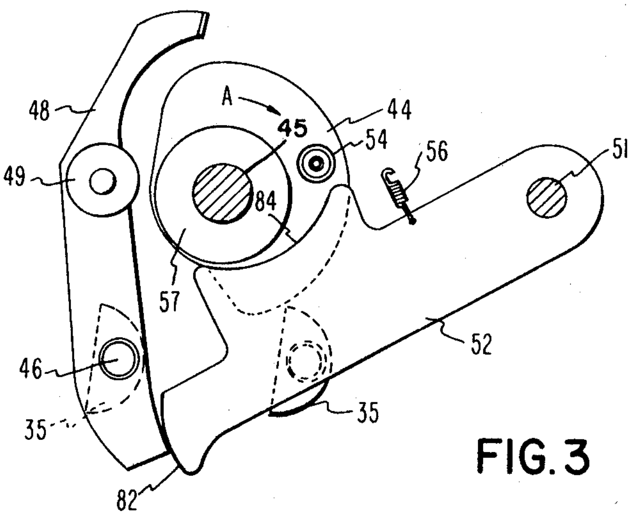
FIG. 3 shows the control and locking levers of FIG. 1 in a position of locked engagement.

Intermediate imprinter cycles cam 44, cam follower arm 48 and lock arm 52 are retained with respect to one another in the position shown in FIG. 1. At the beginning of the cycle as cam 44 turns in the direction of arrow A lock arm 52 is first released from cam roller 54 and pivots into an abutting relation with the cam follower arm 48. At the termination of the dwell during which cam follower 49 follows the raised portion of the cam, cam follower arm 48 is permitted to move toward the axis of the cam during the drop portion of the cycle. As cam follower arm 48 pivots clockwise, as seen in FIG. 3, the eccentrics 35 pivot in unison therewith causing the bed 29 to rise until contact between the sensing shoe 25 and the sales check 86 or the upper surface of the credit card restrain further upward movement of the bed and consequently pivoting of the eccentrics and the cam follower arm causing cam follower 49 to leave the cam surface. Meanwhile, the lock arm which presents a peripheral end surface 82 of increasing radius, in a counterclockwise direction as viewed in FIG. 3, has moved behind the lower edge surface of the cam follower arm 48, in abutting relation therewith, to restrain the cam follower arm against movement in a counterclockwise direction. During this portion of cam rotation when the cam follower arm and consequently bed 29 are locked in a position which prevents downward movement of the bed, the printing platen is moved from right to left as viewed in FIG. 4 to imprint the information from the print member upon the documents interposed between the platen 62 and the print member 32. As cam 44 continues to rotate in the direction of arrow A past the position shown in FIG. 3, the cam roller 54 engages the arcuate surface 84 of locking lever 52 to disable the locking condition and return locking lever to its inoperative position and immediately thereafter the rise portion of the cam engages the cam follower arm follower 49 to pivot the cam follower arm in a counterclockwise direction lowering bed 29 and terminating the cycle as the cam again assumes the position shown in FIG. 1.

The configuration of locking lever 52 and cam follower arm 48, in the illustrated embodiment are such that when the gauge shoe 25 senses a document thickness of less than ten thousandths of an inch (or ten mils) the elevation of the bed 29 permits the cam follower lever to pivot in toward the cam surface sufficiently to allow the locking lever to move into contact with the washer peripheral surface leaving a clearance between the locking lever radial end surface 82 and the cam follower lever. In this condition bed 29 is not locked against downward movement until contact is made with locking lever 52, and under these circumstances the force resisting the roller platen is limited to the biasing force of the spring 43 which urges the bed upward to give a soft print condition. When the sensing shoe surface 26 encounters a document thickness exceeding 10 mils, locking lever 52 engages cam follower arm 48 as previously described to positively resist downward movement of the bed and create a predetermined positive interference or hard print between the print member 32 and the roller platen 62.

In the described embodiment wherein only the account number is printed on the journal tape, requiring less pressure with the nominal thickness of both the carbon strip and journal tape combining to a total thickness of approximately 4 mils, the locking lever does not come into locking engagement with the cam follower arm and a soft print condition is effected. When during the second print operation a sales check, as for example a five copy four carbon check 86, is inserted between the ribbon and the journal paper, a composite pad of increased thickness, normally about 22 mils, is sensed by the shoe 25. In this condition where a positive interference is required between the roller platen and the print member to effectively print five duplicate copies the locking lever engages the cam follower lever to provide a positive interference and a hard print.

Disposing the sensing rail gauge shoe in a position to compress the carbon ribbon and journal tape between the bed and gauge shoe in addition to the credit card and sales check will provide an opportunity to fully correct for the variations in both thickness and hardness of the composite stack. However, in certain circumstances, as where a fragile carbon ribbon is used, it may be desirable to modify this procedure.

As seen in FIG. 6, the sensing rail gauge shoe 25 engages the credit card 32 or credit card and sales check 86 beyond the margin of the journal tape 60 and carbon ribbon 61. Since the journal tape and carbon ribbon are normally of closely uniform thickness, this thickness can be compensated in the design of the gauge shoe 25 and bed 29 without the necessity of restraining these two strips during each print operation. Further, since some tendency exists for the adjoining sheets of the document to slide laterally or shingle as the roller platen 62 is moved across the pad the nonrestraint of the carbon ribbon avoids damage thereto.

Because thicker or multiple part documents are normally softer, greater interference between the rollet platen and print member is necessary to secure a proper impression. In order to achieve the desired initial interference between print element and document, the measured document thickness can be made a function of the sensing shoe area and the biasing force without respect to the composition of the document. For instance, if it is sought to create a desired printing pressure at initial interference for a given character area without respect for the nominal thickness and spring characteristics of the document one could use a given combination of biasing force and shoe area to achieve the same desired pressure under the sensing shoe.

In the embodiment described the relatively soft print condition is utilized when printing the account number only on the journal tape. By proper selection of the yieldable preload force, a proper printed impression can be achieved by allowing articulation within the printer assembly to accommodate varying print member character heights. When printing a multiple thickness pad of paper, greater interference is required to attain a desirable print quality; however, the pad thickness serves also to protect the print member against damage and a positive interference, relatively hard print condition is often desirable. In the embodiment illustrated and described herein a multiple line impression must be made on the multiple sheet pad requiring greater overall force to maintain adequate print pressure during the multiple line print operation as compared with the character by character print operation when recording only the account number. Further, the mode of printing during the multiline imprint cycle portion must accommodate to an indefinite number of characters at any given portion of the imprint cycle as represented by the number and position of characters in various lines of the print element. Accordingly, a constant predetermined interference, relatively hard print is selected for the multiline portion of the print cycle.

The device shown herein utilizes the thickness of the pad to be printed as the determining parameter in the selection of the type of print condition to be utilized during each imprinting operation. It will be appreciated that other conditions could be utilized to determine whether a hard or soft print system is to be used during any specific imprinting cycle or operation and selection may be controlled on the basis of the chosen parameter.

What is claimed is:

1. A printing machine comprising:

a frame member;

printing means carried by said frame member;

a bed member carried by said machine and movable toward and away from said printing means;

a print element supported on said bed member and having raised characters;

sensing means for determining the thickness of documents intermediate said printing means and said print element;

said sensing means including a sensing shoe carried by and depending from said frame member with a surface disposed in the path of travel of said bed member and biased toward the surface of said print element;

control means for moving one of said members toward and away from a first position of predetermined interference between said printing means and said print element, said first position being variably established in response to the sensed thickness of the documents;

said control means including spring means connected to said bed member and urging said bed member toward said first position;

a cam member rotatably mounted on said machine;

a control arm pivotally mounted on said machine with a cam follower portion engageable with said cam member; and means connecting said control arm to said control means to move said bed member;

said cam member during a first portion of rotation thereof engaging said control arm follower portion to cause said bed to be moved away from said first position and during a second portion of rotation thereof permitting said spring means to urge said bed towards said first position.

2. The printing machine of claim 1 wherein said control means is comprised of a pair of eccentric elements pivotably mounted on said machine on parallel axes and interconnected for pivoting in unison, said eccentric elements being operable to reciprocate said bed toward and away from said first position and said spring means being connected to said eccentric elements to urge said eccentric elements in one pivotal direction.

3. The printing machine of claim 1 further comprising releasable locking means engageable with said lever member to establish interfering engagement therewith during a portion of the rotation of said cam member and positively retain said bed member in said first position.

4. The printing machine of claim 3 wherein said releasable locking means comprises a locking lever biased toward and engageable with said cam member, said locking lever having a surface of increasing radius releasably engageable with said lever member to resist pivotal movement of said lever member in a direction opposite the direction urged by said spring means.

5. A printing machine comprising:

a bed member carried by said machine;

a print element having raised characters, supported on said bed;

a frame member;

a sensing shoe carried by said frame member and projecting toward said print element for sensing the thickness of documents disposed between said sensing shoe and said print element;

control means for moving one of said members toward and away from a first position wherein an intermediate document and said print element are compressively retained between said bed member and said sensing shoe; and releasable locking means for selectively retaining said one of said members in said first position;

said control means including biasing means urging said one of said members toward said first position and a control level pivotable to effect said moving of said one of said members and said releasable locking means including a locking lever pivotably mounted on said machine and selectively engageable with said control lever to prevent pivoting of said control lever in a direction to move said one of said members away from said first position.

6. The printing machine of claim 5 wherein said first position is variable dependent upon the thickness of documents disposed between said sensing shoe and said print element and said locking lever includes a surface of increasing radius pivotable to a position of interference with said control lever to maintain said one of said members in said first position.

7. A printing machine comprising a bed mounted on said machine for reciprocating movement;

a print element having raised characters and supported on said bed;

an ink source;

print means for pressing said ink source against a document overlying said print member to create thereon an impression of the characters on said print member;

elevating means for reciprocating said bed toward and away from a first position whereat said print element is disposed at the desired printing position with respect to said print means in response to the thickness sensed;

said elevating means including a lever member pivotable by said control means;

releasable locking means for selectively retaining said bed in said first position;

said releasable locking means including a locking lever pivotably mounted on said machine with a surface of increasing radius which selectively pivots into a position of interference with said lever member to maintain said bed in said first position; and control means for cycling said elevating means to move said bed toward and away from said first position and wherein said first position is variable dependent upon the thickness of said document overlying said print member and said print element.

8. A printing machine comprising a bed mounted on said machine for reciprocating movement;

a print element having raised characters and supported on said bed;

an ink source;

print means for pressing said ink source against a document overlying said print member to create thereon an impression of the characters on said print member;

elevating means for reciprocating said bed toward and away from a first position whereat said print element is disposed at the desired printing position with respect to said print means in response to the thickness sensed;

releasable locking means for selectively retaining said bed in said first position;

sensing means for determining the thickness of documents disposed between said print element and said print means; and selecting means for actuating said locking means to retain said bed in said first position when said sensing means senses a predetermined document thickness and disabling said locking means when said sensing means senses less than said predetermined document thickness.

References Cited

UNITED STATES PATENTS

| | | | |
|---|---|---|---|
| 2,909,998 | 10/1959 | Maul | 101—269 |
| 3,179,046 | 4/1965 | Maul et al. | 101—269 |
| 3,277,822 | 10/1966 | Maul et al. | 101—269 |
| 3,388,659 | 6/1968 | Hu | 101—269 |
| 3,410,207 | 11/1968 | Barbour | 101—269 |
| 3,416,441 | 12/1968 | Maul et al. | 101—56 |
| 3,340,800 | 9/1967 | Gruver et al. | 101—269 |

ROBERT E. PULFREY, Primary Examiner

E. H. EICKHOLT, Assistant Examiner

U.S. Cl. X.R.

101—274, 281, 283